N. B. HANI.
SHAFT OR AXLE BEARING.
APPLICATION FILED JUNE 6, 1912.

1,098,149.

Patented May 26, 1914.

Witnesses:
J. F. Wallace
William F. Martinez

Inventor:
Negib Bechara Hani,
By Attorneys,

UNITED STATES PATENT OFFICE.

NEGIB BECHARA HANI, OF PARIS, FRANCE.

SHAFT OR AXLE BEARING.

1,098,149.   Specification of Letters Patent.   Patented May 26, 1914.

Application filed June 6, 1912.   Serial No. 702,077.

*To all whom it may concern:*

Be it known that I, NEGIB BECHARA HANI, a subject of the Ottoman Empire, residing in Paris, France, have invented certain new and useful Improvements in and Relating to Shaft or Axle Bearings, of which the following is a specification.

This invention relates to bearings for axle journals and rotating shafts and contemplates the employment of rollers or similar friction reducing devices arranged in a cage or the like around the axle journal or the journal of the rotating shaft together with roller bearings for resisting end thrust.

In roller bearings as previously proposed, when the rollers become worn and either break or jam, the axle journal or other bearing surface is no longer supported in a proper manner.

The improved arrangement constituting the present invention has for its object to avoid these disadvantages by providing in the interior of the bearing a steel sleeve, the external diameter of which is of such dimensions that the rollers accurately engage with the surface of the sleeve so as to rotate thereon, the internal diameter of the sleeve being the same as the diameter of the axle journal or of the bearing surface of the shaft. The bearing being placed in position on the journal of the shaft from one end is so arranged that there is no play between the interior of the sleeve and the journal or bearing surface, the sleeve being, however, so arranged as to be capable of rotating on the journal if necessary. Under normal conditions the external surface of the steel sleeve is carried around by the journal or bearing surface upon which it is mounted and rotates within the interior of the roller cage; in the event of an accident to one or more of the rollers so that the rotation of the sleeve can no longer take place freely within the roller cage, the friction thus created between the rollers and the sleeve causes the latter to remain stationary relatively to the roller cage, and the axle journal or bearing surface of the shaft under these circumstances rotates within the internal sleeve of the bearing without damage.

A further important feature of the invention is that any longitudinal displacement of the bearing relative to the shaft is avoided by the provision of radially arranged roller guides at the ends of the bearing.

Figure 1:
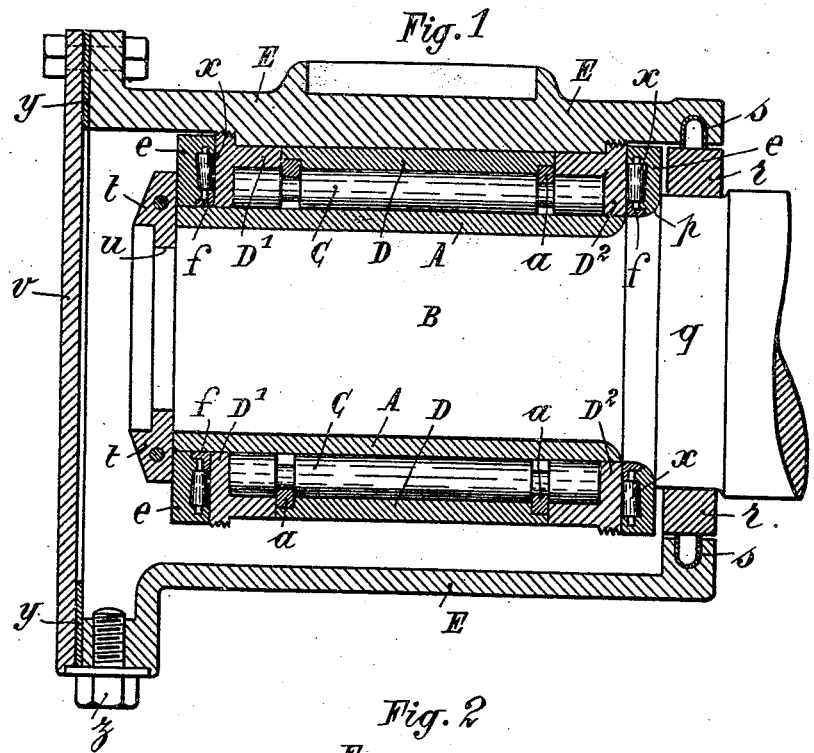
Figure 2:
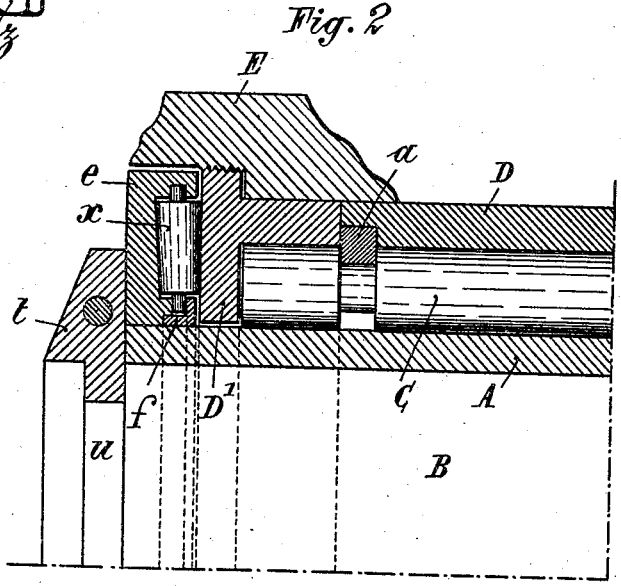

The improved bearing is illustrated in the accompanying drawings as applied to an axle journal, Figure 1 being a longitudinal section and Fig. 2 being a view in sectional elevation of the outer end of an axle journal on which the bearing is mounted, on an enlarged scale.

The bearing comprises a cylindrical sleeve A which is accurately fitted to the bearing surface of a journal B. The sleeve A can, if required, rotate about the journal B, but does not normally rotate on the journal, its external surface serving as a rolling surface for the cylindrical rollers C mounted in a cage; these rollers are maintained in position in the longitudinal direction by narrow external retaining rings $a$. The rollers C are arranged in a cylindrical cage D, which is located inside a cast iron housing E, such as is ordinarily employed on railway vehicles. The cylindrical rollers C thus rotate between the stationary cage D and the sleeve A which is rotated by the axle journal. At the two ends of the bearing conical roller guides $x$ are radially arranged, these rollers $x$ being located in an annular cage $e$; that pivot of each roller $x$ which is adjacent to the larger end of the roller, as will be seen from Fig. 2, is adapted to rotate freely within the outer flange of the cage $e$ the other pivot being retained in position by a ring $f$ firmly secured to the inner flange of the cage.

The stationary cage D in the interior of which the cylindrical rollers C rotate, is not made in a single piece, but is divided into three portions, a middle portion D and two side portions $D^1$, $D^2$, which are of T-shaped cross section; the latter sections constitute flanged rings screw-threaded on their outer peripheries and engaging with the interior of the oil box E, the rings $D^1$, $D^2$ constituting abutments for the conical thrust rollers $x$.

At one side of the axle wheel, that is to say on the inner side of the journal B (right hand side of Fig. 1), on which the rotatable sleeve A is mounted, the annular cage e with its conical rollers x is supported by the shoulder p of the axle; on the cylindrical part q of the axle the ring r is mounted and rigidly secured thereto and an annular cup leather s engaging with the external surface of the ring r, the cup leather s being located in a groove formed in the oil box E, thus hermetically sealing the bearing and preventing the entrance of dust.

On the outer end of the journal (left hand side of Fig. 1) the annular cage e containing the conical rollers x which engage with the flanged ring $D^1$ is retained in position by a collar t formed in two semicircular parts which when assembled together are engaged in a groove u formed on the extremity of the journal. At this end the oil box is closed by a bolted cover v, with a packing ring y of leather or other material interposed forming a hermetic joint.

A removable plug for drawing oil from the oil box E is provided at z adjacent to the end of the journal.

The rotatable sleeve A, instead of being made in one piece is preferably formed in three parts to facilitate manufacture, the joints of the various portions being arranged adjacent to the rings a which guide and secure in position the cylindrical rollers C.

Claims:

1. A roller bearing comprising an axle, a loose bearing sleeve surrounding said axle, rollers, a boxing or cage adapted to be secured to an axle-box or block and between which and said sleeve said rollers are adapted to bear, said boxing or cage being formed in a plurality of annular bearing parts, said boxing having an annular internal groove at the intersection of annular parts of said cage, said rollers having annular grooves therein, and annular rings fitting partially within said groove in said cage or boxing and partially within a groove in said rollers.

2. A roller bearing comprising an axle, a loose bearing sleeve surrounding said axle, rollers, a boxing or cage adapted to be secured to an axle box or block, and between which and said sleeve said rollers are adapted to bear, said boxing or cage being formed in three annular parts, said boxing having an annular internal groove at the intersection of each of said annular parts of said cage, said rollers having annular grooves therein, and annular rings fitting partially within said grooves in said boxing or cage and partially within said grooves in said rollers.

3. A roller bearing comprising an axle, a loose bearing sleeve surrounding said axle, rollers, a boxing or cage adapted to be secured to an axle-box or block and between which and said sleeve said rollers are adapted to bear, said boxing or cage being formed in a plurality of annular bearing parts, being of a length equal to the length of said rollers and providing a bearing for the rollers throughout the length thereof, said boxing having an annular internal groove at the intersection of annular parts of said cage, said rollers having annular grooves therein and annular rings fitting partially within said groove in said cage or boxing and partially within a groove in said rollers, and end thrust bearings comprising radial rollers, and cages therefor, said rollers having their bearing at each end thereof against an integral part of said first-mentioned cage.

4. A roller bearing comprising an axle, a loose bearing sleeve surrounding said axle, rollers, a boxing or cage adapted to be secured to an axle-box or block and between which and said sleeve said rollers are adapted to bear, said boxing or cage being formed in a plurality of annular bearing parts, being of a length equal to the length of said rollers and providing a bearing for the rollers throughout the length thereof, said boxing having an annular internal groove at the intersection of annular parts of said cage, said rollers having annular grooves therein and annular rings fitting partially within said groove in said cage or boxing and partially within a groove in said rollers, said annular parts having, at the inner and outer ends of the bearing, portions extending over the ends of said rollers, and end thrust bearings adapted to bear against said end bearing portions of said first-mentioned cage portions.

5. A roller bearing comprising an axle, a loose bearing sleeve surrounding said axle, rollers, a boxing or cage adapted to be secured to an axle-box or block and between which and said sleeve said rollers are adapted to bear, said boxing or cage being formed in a plurality of annular bearing parts, being of a length equal to the length of said rollers and providing a bearing for the rollers throughout the length thereof, said boxing having an annular internal groove at the intersection of annular parts of said cage, said rollers having annular grooves therein and annular rings fitting partially within said groove in said cage or boxing and partially within a groove in said rollers, said annular parts having, at the inner and outer ends of the bearing, portions extending over the ends of said rollers, and end thrust bearings adapted to bear against said end bearing portions of said cage portions, said end thrust bearings comprising radial rollers, and cages therefor, said rollers having their bearing at each end thereof against an integral part of said first-mentioned cage.

6. A roller bearing comprising an axle, rollers, a boxing or cage adapted to be secured to an axle-box or block and between which and said axle said rollers are adapted to bear, said boxing or cage being formed in a plurality of annular bearing parts, said boxing having an annular internal groove at the intersection of annular parts of said cage, said rollers having annular grooves therein and annular rings fitting partially within said groove in said cage or boxing and partially within a groove in said rollers.

In witness whereof, I have hereunto signed my name in the presence of two subscribing witnesses.

NEGIB BECHARA HANI.

Witnesses:
 LUCIEN MEMMINGER,
 RENÉ BARDY.